United States Patent [19]
Friedman et al.

[11] Patent Number: 5,341,464
[45] Date of Patent: Aug. 23, 1994

[54] LUMINANCE EMPHASIZED COLOR IMAGE RENDERING

[75] Inventors: Steven J. Friedman, Bellevue; Karen A. Hargrove; Joseph M. Joy, both of Redmond; Nathan P. Myhrvold, Bellevue; Sunita Shrivastava, Redmond; Gideon A. Yuval, Mercer Island, all of Wash.

[73] Assignee: Microsoft Corporation, Redmond, Wash.

[21] Appl. No.: 77,852

[22] Filed: Jun. 16, 1993

Related U.S. Application Data

[63] Continuation of Ser. No. 995,854, Dec. 23, 1992, abandoned.

[51] Int. Cl.$^5$ .............................................. G06F 15/62
[52] U.S. Cl. .................................. 395/131; 395/132; 345/155; 345/153; 345/199
[58] Field of Search ............... 395/131, 132; 345/199, 345/153, 155, 154, 149; 358/458, 457

[56] References Cited

U.S. PATENT DOCUMENTS

| | | | |
|---|---|---|---|
| 4,689,669 | 8/1987 | Hoshino et al. | 345/153 X |
| 4,843,379 | 6/1989 | Stansfield | 345/154 |
| 4,907,075 | 3/1990 | Braudaway | 395/131 X |
| 5,068,644 | 11/1991 | Batson et al. | 345/199 |
| 5,130,701 | 7/1992 | White et al. | 345/199 |
| 5,233,684 | 8/1993 | Ulichney | 395/131 |

OTHER PUBLICATIONS

*Digital Halftoning* by Robert Ulichney, Second printing 1988; Chapters 1, 5, 6, and 7.
*Computer Grpahics: Principles and Practice* by Foley, van Dam, Feiner, and Hughes, Reprinted with corrections Nov., 1991; Chapter 13, pp. 563–604.
*Dithering for 12-Bit True-Color Graphics* by Wells, Williamson and Carrie of Sun Microsystems; IEEE Computer Graphics & Applications, Sep. 1991, pp. 18–29.

*Primary Examiner*—Raymond J. Bayerl
*Attorney, Agent, or Firm*—Klarquist Sparkman Campbell Leigh & Whinston

[57] ABSTRACT

A high color resolution image is rendered using a palette having a lower color resolution. The color of each pixel in the image is mapped to the nearest of the palette colors located on or between levels of uniform luminance adjacent to the pixel color. The mapping of the pixel color is further constrained to exclude palette colors for which double the error to the pixel color is outside the color gamut. The mapping is performed efficiently by a look-up table, the size of which is reduced by first dithering the pixel color to a color in an intermediate palette and then indexing the table using the intermediate palette color to find the reduced palette color. The mapping can be performed in an error diffusion process in which the pixel's color is modified by error diffused from any previously rendered neighboring pixels, then mapped to a reduced palette color to render the pixel with the reduced palette color, and finally diffuse any error between the pixel's color and the reduced palette color to any not yet rendered pixels.

21 Claims, 5 Drawing Sheets

LUMINANCE EMPHASIZED COLOR IMAGE RENDERING

This is a continuation division of application Ser. No. 07/995,854, filed Dec. 23, 1992, now abandoned.

FIELD OF THE INVENTION

The present invention relates to an apparatus and a method for maximizing the quality of a color image at a given color resolution and more particularly relates to reproducing a high quality color image using a lower color resolution.

BACKGROUND OF THE INVENTION

To accurately represent a color image using digital electronics, the image is quantized to discrete locations and colors. Typically, the image is divided into a two-dimensional grid of uniformly shaped boxes, and each box is assigned a single color. This allows a computer system to represent a color image internally as a two-dimensional array of digital color values. Images represented in this manner are known as bitmapped images. A typical color imaging standard currently in use (the VGA standard), represents a color image with a 640×480 array of 4-bit color values. Such an array of color values can be easily stored by the computer system in a memory device. Also with this form of color image representation, the computer system can easily reproduce the stored image using a color monitor or printer with an array of colored dots (commonly referred to as pixels).

In a typical computer system, color is quantized according to the red-green-blue (RGB) color model. According to the RGB model, colors are specified by an ordered triple of values corresponding to the intensities of red, green, and blue light that are mixed to form the color. (Red, green and blue light are considered to be additive primaries.) Each of the intensity values varies from zero to one, with a one indicating full intensity of the color. For example, the ordered triple, (1,0,1), refers to the color magenta formed by the mixture of full intensity red with full intensity blue. The RGB color model is directly applicable to color monitors wherein an electron gun is used to excite red, green and blue phosphors on a screen to varying intensities. The range of colors that are displayable on such a device is known as the color gamut of the device. Other color quantization models are also commonly used and may be more suitable to some applications. However, in general, all color models use a three dimensional representation of the color gamut.

At times, colors are specified even more abstractly in a computer system using a single number or color value instead of an ordered triple in order to minimize the space required to store an image. Usually, the computer system maintains a look-up table to associate these color values with their corresponding RGB (or other color model) ordered triple. The colors in the table make up a set of colors that can be simultaneously used in a single image. The set of colors that can be simultaneously used in an image is known as the color palette.

The perceived quality of the digitized color image when reproduced depends upon its spatial and color resolutions. The spatial resolution of an image is related to the number and size of the boxes (or pixels when reproduced) into which the image is divided (and hence related to the size of the array used to represent the image). The color resolution of an image is related to the number of discrete colors that can be simultaneously used in the image (i.e., the size of the color palette). The greater the spatial and color resolutions of an image, the better its quality. For example, an image displayed with a spatial resolution of 1024×768 pixels is of perceptibly higher quality than the same sized image displayed with a spatial resolution of 640×480 pixels. Also, when displayed, an image where each color is represented by an 8-bit value (allowing the use of up to 256 different colors in the same image) is of perceptibly higher quality than an image where each color is represented by a 4-bit value (16 different simultaneous colors).

Current high end computer systems represent color images with 24-bit color values (16.8 million colors) and provide a spatial resolution of 1280×1024 or higher. Systems with 24-bit color resolution are considered to be "true color" systems since the color at any pixel in the digitized image is specified with adequate color resolution to be indistinguishable from its actual color in the original image. These systems are therefore capable of reproducing images with astonishing tonal accuracy and crispness.

There are situations, however, when it is desirable to reproduce an image that has been digitized at a certain color resolution (24-bit true color, for example) using a lower color resolution. For example, it may be desirable to display with pre-existing VGA or super VGA standard hardware a color image digitized at a higher color resolution. It may also be desirable to design less expensive hardware than that required for 24-bit color resolution while providing a similar image quality. This problem can be restated generally as that of achieving the best quality color image with a limited color resolution.

In the prior art, two different approaches have been taken to solving the problem of optimizing the quality of a high resolution image reproduced at a low color resolution. The first approach involves optimally choosing the set of colors for the color palette. In typical computer systems, the color palette is user selectable, not fixed. Thus, in a VGA standard (4-bit color resolution) system, some or all of the palette of 16 colors can be designated by the user. The quality of a reproduced image can be greatly enhanced by properly selecting the optimal color palette.

Some prior art systems use adaptive techniques aimed at choosing colors for a palette that are optimal for the particular image being reproduced. One such technique is known as the popularity algorithm. This technique chooses as colors for a palette, those colors which occur most frequently in the image being reproduced. For example, for 8-bit color resolution reproductions, the 256 colors used most frequently in the image are chosen to fill the color palette. Then, when the image is reproduced, each color in the image is mapped to the nearest color in the palette. Usually, the quality of the resulting image is greatly enhanced since the actual colors of most of the image's pixels will be in the palette.

Such adaptive palette techniques, however, produce undesirable effects in a windowing environment in which several images may be simultaneously displayed. Adapting the color palette to an individual image on the display typically degrades the quality of the remaining images. Also, when the focus of the windowing environment is subsequently changed to another individual image on the display, the color palette must be re-adapted to that image. Consequently, the quality of the image to which the color palette was previously adapted becomes degraded. This undesirable effect is known as a palette war.

A second approach relies on the eye's ability to blend the colors of adjacent pixels so that an intermediate color is perceived. This approach focuses on how the pixel colors are mapped to colors in the palette to best approximate the pixel color when viewed by the human eye. (The process of mapping pixel colors to palette colors is also referred to herein as "rendering" a pixel color.)

In a standard mapping of pixel colors to palette colors, the pixel colors are simply mapped to the nearest palette color. (The nearness of two colors is determined by the distance separating the colors in the RGB or other color model.) The result is that all pixels in an area of uniform color are mapped to the same palette color. Although the pixel color is mapped to the nearest palette color, there may be a significant difference or error between the pixel color and the mapped palette color. This difference can often be readily perceptible to a viewer.

Better results can be obtained with mapping techniques that alternately map a pixel color to two or more of the nearest palette colors such that the average error between the pixel color and the palette colors is zero. When pixels are mapped in this fashion, the eye blends or averages the palette colors of several neighboring rendered pixels in the reproduced image to perceive an approximation of the original pixel colors. Two techniques that use this approach are ordered dithering and error diffusion. These techniques are both generally referred to as dithering processes.

With the ordered dithering technique, a uniform grid of colors is used as a palette (i.e. the colors of the palette are uniformly spaced in each of the red, green and blue dimensions). A pixel's color is mapped by adding an amount of dither to each dimension of the color's corresponding RGB ordered triple and then truncating the result to a palette color. The amount of dither added is dependent on the position (in cartesian coordinates) of the pixel in the image. The pixel's cartesian coordinate is used to locate a scaling factor in a square (n×n) threshold matrix. For a pixel with the cartesian coordinate (x,y) the scaling factor located at the position (x mod n, y mod n) in the threshold matrix is used. To determine the amount of dither added in each dimension of the color model, the scaling factor is multiplied by the spacing between palette colors in that dimension. By determining the amount of dither with a threshold matrix rather than randomly, the amount of dither varies in a recurring pattern across the image. This produces an appearance of uniform color in those areas of an image originally uniformly colored. The following is a typical threshold matrix.

$$\begin{matrix} 0 & \frac{6}{16} & \frac{9}{16} & \frac{15}{16} \\ \frac{11}{16} & \frac{13}{16} & \frac{2}{16} & \frac{4}{16} \\ \frac{7}{16} & \frac{1}{16} & \frac{14}{16} & \frac{8}{16} \\ \frac{12}{16} & \frac{10}{16} & \frac{5}{16} & \frac{3}{16} \end{matrix}$$

With error diffusion, the color of each pixel is not mapped independently of its neighboring pixels to palette colors. When error diffusing, the color of the pixels in the image are mapped one-by-one straightforwardly to the nearest palette color. However, as each pixel is mapped, the error (or directed distance in the color model) between the actual pixel color and the palette color to which it is mapped is calculated. This error is diffused to those neighboring pixels which have not yet been mapped. A common method for diffusing the error is known as the Floyd-Steinberg filter, represented by the following matrix (which assumes the pixels are mapped from left to right and top to bottom).

$$\begin{matrix} 0 & 0 & 0 \\ 0 & \text{CURRENTPIXEL} & \frac{7}{16} \\ \frac{3}{16} & \frac{5}{16} & \frac{1}{16} \end{matrix}$$

According to the Floyd-Steinberg filter, 7/16 of the error is added to the pixel to the right of the pixel being mapped, 5/16 to the pixel below, 3/16 to the pixel below and left, and 1/16 to the pixel below and right. Other commonly used error diffusion filters include the Stucki filter and the Burkes filter.

One problem with both the ordered dithering and error diffusion techniques is that discernable artifacts are often produced in the image. Thus, while the standard ordered dithering and error diffusion techniques serve to improve the color quality of the image, the resulting image is generally flawed. The object of the present invention therefore is to reproduce color images using a lower color resolution while maintaining a high color quality. A further object is to reproduce color images with minimal artifacts.

SUMMARY OF THE INVENTION

The present invention maximizes the color quality of images reproduced at lower color resolutions by using a single, carefully designed color palette. To avoid palette wars and the additional computational overhead associated with adaptive palette methods, the present invention utilizes the same palette in the reproduction of all images. This universal palette is structured according to the sensitivities of the human eye to maximize the quality of reproduced images with a minimum color resolution.

The human eye is actually more sensitive to the luminance of light than to its color, and is particularly able to distinguish differences in luminance at low luminances of light. Color can therefore be more efficiently encoded by emphasizing luminance over color and by concentrating palette colors in the regions of the color model having a lower luminance.

In order to emphasize luminance over color, the colors of the palette are chosen by first selecting a plurality of levels of uniform luminance in the color model and then selecting the palette colors from those luminance levels. The palette colors are thus grouped into levels of uniform luminance. With this structure, luminance can be emphasized over color when mapping pixels by mapping pixel colors to the nearest of the palette colors on an adjacent luminance level even when a palette color on a non-adjacent luminance level would be closer in color.

The palette colors are concentrated towards lower luminances by spacing the luminance levels closer together near black in the color model and farther apart near white. (In the RGB model, black is formed when red, green and blue primaries are at their minimum intensity and white is formed when the primaries are all at their maximum intensities.) In one embodiment of the invention, the spacing between luminance levels increases from black to white according to a cubic function.

The human eye is also more sensitive to some colors of light than others. The custom palette can therefore be further structured according to these sensitivities to provide more efficient color encoding. For example, when an image is reproduced using dithering techniques (e.g., ordered dithering and error diffusion) intended to render non-palette colors using patterns of two or more palette colors, the eye may be unable to effectively blend the colors in the pattern if it is particularly sensitive to the difference between those colors. Instead of sensing the intended non-palette color, the eye perceives the color pattern itself. When such patterns are perceptible to the eye, they are known as mapping or rendering artifacts.

One particular sensitivity of the human eye is its greater sensitivity to colors of low saturation (e.g., pastels). In other words, the eye is better capable of discerning a difference between colors with low saturation than between colors of high saturation. Since the eye is very sensitive to the difference between low saturation colors, the rendering of a low saturation color with a pattern comprising a gray and a high saturation color should be avoided. The eye will instead perceive the pattern itself (an artifact). Also, the rendering of a gray color using a patten of two highly saturated colors should be avoided. The perceptible artifacts resulting from such renderings are referred to herein as the Saruman effect.

In the present invention, the Saruman effect is avoided by structuring the palette to include the gray color on each of the luminance levels, and a circle of additional colors on each luminance level around the gray color. The number of additional colors encircling the gray on each level is related to the area of the luminance level within the color model. On luminance levels having larger areas, the additional colors can be grouped in two or more circles. By including the gray color of each luminance level, it is never necessary to render gray colors or very lowly saturated colors with a pattern of more highly saturated colors. Also, by including a number of additional colors in a circle around the gray color on each luminance level, it is not necessary to render a color of low saturation using a gray and a fully saturated color. Instead, two or more of the additional colors, which have a low saturation, can be used.

A further problem results from attempting to render a color near the boundary of the color model (a highly saturated color) by averaging colors near the center of the color model (colors of lower saturation). Actually, it is impossible to render highly saturated colors in this manner. In order to render a pixel color by blending a pattern of other colors with the eye, the blended colors must surround (or be located on opposite sides of) the pixel color in the color model. Thus, when the pixel color lies on or near a boundary of the color model, it can only be rendered using a pattern which includes at least one color on the boundary of the color model.

To guarantee that all colors in the color model can be rendered, the palette must include at least the colors at the vertices of the color model. Pixel colors on a boundary of the color model can then be rendered using the colors at the vertices of the color model that lie on each side of that pixel color. However, since in the present invention, pixel colors are mapped to palette colors from only those luminance levels adjacent the pixel color, the palette should include the colors at the vertices of at least every other luminance level. Boundary colors can then be rendered by mapping to colors at the vertices of one of the adjacent luminance levels.

The eye is also more sensitive to changes in the intensity of the green component of colors than to changes in the intensity of the red component, and more sensitive to changes in the intensity of the red component than the blue component. Further, the eye is particularly sensitive to artifacts on images of the human face and in large areas of constant color or smooth gradations of color. To prevent discernable artifacts from appearing when rendering these types of colors, the palette colors are chosen to be more concentrated in those regions of the color model where the eye is most sensitive. For example, the palette colors will be chosen to be more highly concentrated in the flesh colors, and sky colors. Also, the palette colors can be chosen to be more closely spaced in the green dimension and further apart in the blue dimension.

The present invention also includes an improved rendering method. One feature of the improved rendering method is a luminance emphasized mapping method. As described above, due to the eye's greater sensitivity to luminance than to color, better results can be obtained by emphasizing luminance over color when mapping pixel colors to the palette. Using a palette which is structured to have palette colors grouped on discrete levels of uniform luminance (such as the palette described above), luminance is given greater emphasis by mapping each pixel's color to the nearest palette color on the luminance levels adjacent to the pixel color. Such mapping ensures that each pixel is mapped to a palette color of nearly equal luminance even if a palette color varying more in luminance from the pixel color would be closer in color.

Another feature of the rendering method is a mapping method for preventing an effect referred to herein as the anti-Saruman effect. The anti-Saruman effect occurs when a color being rendered is highly saturated and the nearest neighboring color in the palette is of low saturation. If the color is rendered using the nearest neighbor, low saturation palette color, a loss in saturation results that cannot be recovered even if the color is also rendered using other highly saturated colors through error diffusion. The anti-Saruman effect can be prevented by preventing mappings of highly saturated colors to low saturation palette colors. In a preferred embodiment of the present invention, mappings of a highly saturated color to a low saturation color are prohibited if the error of the highly saturated color from the low saturation color, when doubled, would be outside the color gamut of the RGB color model. The highly saturated color is instead mapped to the nearest palette color not violating this rule.

In a preferred embodiment of the invention, the above described mapping methods are utilized as part of an error diffusion process. In accordance with the error diffusion process, the color of a pixel, as modified by error diffused from previously rendered pixels, is mapped to a palette color using the mapping methods. The error or distance in the color model of the palette color from the unmodified pixel color is then calculated. Finally, the error is diffused to not yet rendered neighboring pixels.

Since the rendering method of the invention can be quite computationally intensive, reproduction of an image using this method can be sped up considerably by pre-determining the mapping of each possible pixel color and storing the results in look-up table form. Images can thereafter be reproduced by simply looking up the mapping of each pixel's color in the table rather than having to calculate the mapping of each pixel as the image is reproduced. However, for an image in which pixel colors are encoded using a high color resolution, such a table may be prohibitively large for most applications. For example, for images where pixel colors are encoded as 24-bit values, such a table would require nearly 16.8 million entries. In the present invention, the table size is reduced through the use of an intermediate palette which has a color resolution intermediate to those of the original image and the custom palette. The mapping of each color in the intermediate palette is stored in a look-up table. Since the number of colors in the intermediate palette is less than the number of possible colors in the image, a much smaller sized look-up table is required. Pixel colors are mapped to the custom palette by first dithering the pixel colors to intermediate palette colors using an ordered dithering method. The mapping of the pixel colors to the custom palette are then determined by looking up the intermediate palette color in the table.

The size of the look-up table can be further minimized without significantly degrading the quality of the reproduced image by also structuring the intermediate palette according to the eye's greater sensitivity to some colors. For example, in accordance with eye's greater sensitivity to changes in the intensity of the green component of colors and lesser sensitivity to changes in the intensity of their blue component, the colors of the intermediate palette are spaced closest together in the green dimension and furthest apart in the blue dimension. More specifically, in the preferred embodiment of the invention, the intermediate palette is structured as a uniform grid of colors with more levels of green than of red, and fewer levels of blue.

Additional features and advantages of the invention will be made apparent from the following detailed description of a preferred embodiment which proceeds with reference to the accompanying drawings.

DETAILED DESCRIPTION OF THE PREFERRED EMBODIMENT

Figure 1:
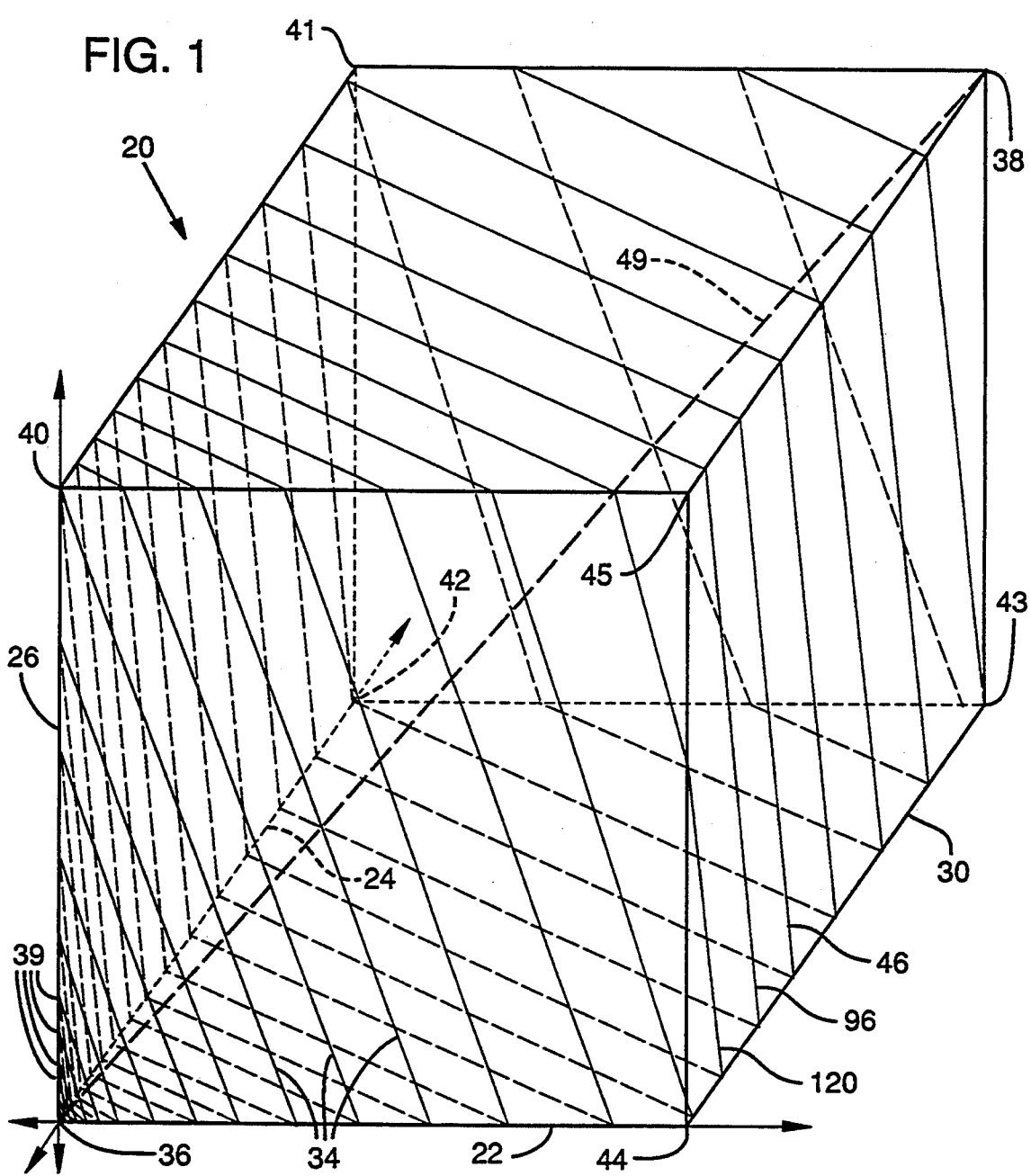
FIG. 1 is a diagram of an RGB color model having a set of uniform luminance levels from which a set of colors of a palette are chosen according to a preferred embodiment of the present invention.

In an RGB color model 20 shown in FIG. 1, colors are represented using an ordered triple corresponding to the intensities of red, green and blue light that are mixed to form the color. Each intensity value in the ordered triple varies from zero for a minimum intensity of the respective color of light to one for full intensity. In a three-dimensional space defined by a red axis 22, a green axis 24, and a blue axis 26, where the axes are perpendicular to each other, the gamut of colors that may be represented using the RGB model lie within a cube 30 having a vertex at the origin and three edges along the red, green and blue axes. The RGB color model 20 is commonly used in computer systems since color monitors in such systems typically illuminate red, green and blue phosphors on their screens to various intensities to produce a color.

The preferred embodiment of the present invention is designed particularly for the reproduction of 24-bit "true" color images using an 8-bit color resolution. The true color images exist in a computer system as a bitmap comprising a two dimensional array of 24-bit color values. In general, the bitmap is stored on a computer in RAM memory, or in a file on a disk storage device. Each 24-bit color value in the bitmap comprises three 8-bit intensity values (i.e. 3 bytes) corresponding to the red, green, and blue intensity values of the RGB color model. With 24-bit color values, the true color image has an initial palette totalling nearly 16.8 million colors. This initial palette is structured as a grid of uniformly spaced colors in the RGB color model.

The preferred embodiment of the invention reproduces the true color image using only eight bits of color resolution per pixel. To obtain the highest quality image from this limited color resolution, the invention utilizes a palette specially designed to include colors selected from levels of uniform luminance (hereinafter referred to as the uniform luminance levels palette or ULL palette). Since the color resolution of the ULL palette is only eight bits, there are only 256 different colors in the palette. When the true color image is reproduced by the present invention, the 24-bit true color of each pixel is mapped to a color in the ULL palette.

With reference to FIG. 1, the colors of the ULL palette are chosen from the colors on a plurality of discrete luminance levels 34 in the RGB color model 20. In the preferred embodiment, there are 26 discrete luminance levels. Each of the luminance levels 34 contains colors having the same luminance. The structure of the ULL palette formed with colors chosen from discrete luminance levels 34 is useful in a luminance emphasized mapping method for mapping pixel colors to the palette as described in more detail below.

In the RGB color model, luminance is determined from the following equation:

$$Y = 0.30 \cdot R + 0.59 \cdot G + 0.11 \cdot B \qquad (1)$$

where Y is luminance, R is the intensity of red, G is the intensity of green, and B is the intensity of blue. Accordingly, the lowest luminance in the RGB color model is at the vertex 36 of the cube 30 at the ordered triple (0,0,0) which corresponds to the color black. The greatest luminance is at the opposite vertex 38 at the ordered triple (1,1,1) which corresponds to the color white. The first or lowest luminance level is therefore defined to include the color black 36 and the twenty-sixth or greatest luminance level is defined to include the color white 38. Since no other colors have the same luminance as either black or white in the RGB color model, these luminance levels each contain only one color. The remaining luminance levels 34 are arranged between the first and twenty-sixth levels.

The luminance levels 34 are preferably arranged such that the spacing between levels increases from the first to the twenty-sixth level. With a closer spacing between levels with low luminance, colors are more efficiently encoded. This is because the human eye is more sensitive to differences in luminance between colors at low luminances and less sensitive to differences at high luminance. Since the eye is less able to distinguish differences in luminance at high luminance, fewer levels of high luminance colors can be provided without degrading image quality. Accordingly, providing fewer high luminance levels by increasing the spacing of the levels at high luminance maximizes the image quality for a given color resolution.

In the preferred embodiment, the luminance of the luminance levels 34 generally increases from black to white according to the following progression involving a cubic function (more specifically, the luminance of the levels are given by the cube of an arithmetic progression of 26 numbers beginning at zero and ending at one):

$$Y = 0, \left(\frac{1}{25}\right)^3, \left(\frac{2}{25}\right)^3, \left(\frac{3}{25}\right)^3, \ldots, (1)^3 \quad (2)$$

Luminance levels spaced in this manner actually appear to be evenly spaced in luminance to the human eye. Strictly speaking, however, the luminance levels in the preferred embodiment are not spaced exactly according to the progression of equation (2). In the preferred embodiment, the spacing between those luminance levels 39 nearest to black 36 is increased to at least a minimum spacing. The spacing of these luminance levels would otherwise be smaller than the spacing between colors in the 24-bit palette and would result in wasted colors. Further, the spacing between the luminance levels 34 are varied slightly so that each of the eight vertices 36, 38, and 40-45 of the RGB color model 20 are on the luminance levels. Inclusion of the colors at the vertices of the RGB color model 20 ensures that all colors in the color model can be rendered using error diffusion, as described in more detail below.

The saturation of the colors on each of the luminance levels varies from a gray color near the center of the luminance level to the colors at its vertices which are the most highly saturated. Referring to the luminance level 46 shown in FIG. 2, a color gray 48 near the center of the luminance level is the least saturated of the colors on the luminance level. The gray 48 lies on a diagonal line 49 (FIG. 1) between black 36 and white 38 in the RGB color model 20. The colors 50-53 at the vertices of the luminance level 46 are the most highly saturated. The saturation of the colors on the level increases in relation to the distance from the gray 48.

When a true color is rendered by blending a pattern of colors differing greatly in saturation, discernible Saruman effect artifacts result. The Saruman effect is particularly likely to result when attempting to render very low saturation true colors such as gray using only high saturation palette colors.

Figure 3:
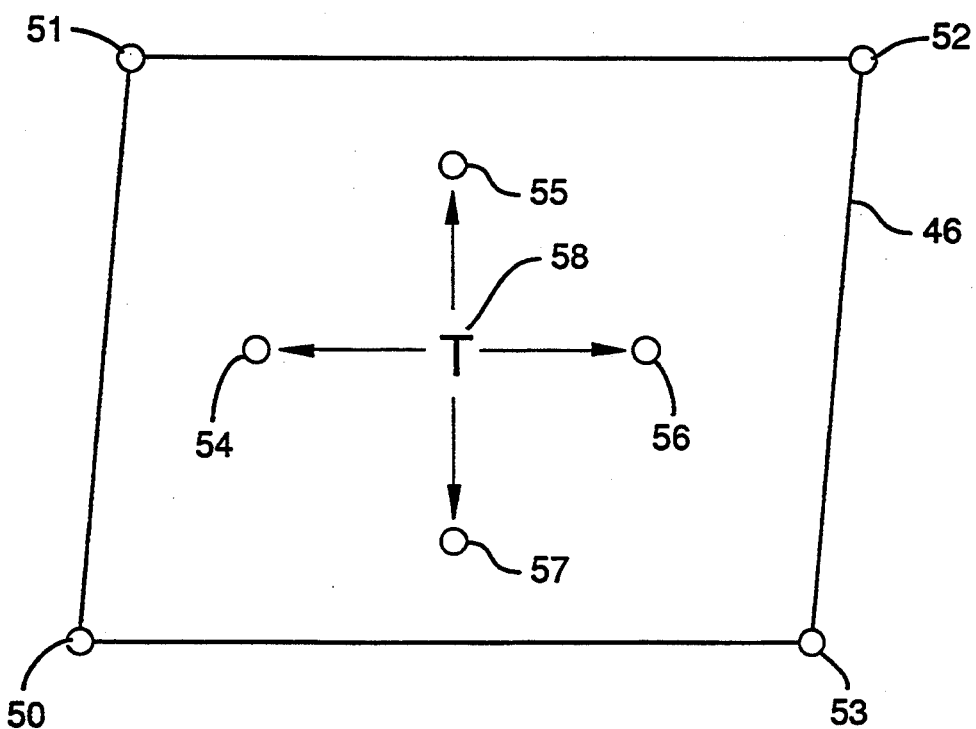
FIG. 3 is a top view of the luminance level of FIG. 2 including an arrangement of colors for a palette that produces Saruman effect artifacts.

With reference to FIG. 3, for example, if the palette includes only the colors at the vertices 50-53 and four other saturated colors 54-57 on the luminance level 46, Saruman effect artifacts will result when rendering a gray true color 58 near the center of the level. The nearest palette colors to the gray true color 58 are the much more saturated colors 54-57. When an area of pixels having the gray true color 58 are rendered with ordered dithering or error diffusion techniques, the gray true color 58 of the pixels is mapped to a pattern of the nearest palette colors 54-57. Since the eye is sensitive to the difference between the saturated palette colors 54-57, discernible Saruman effect artifacts result.

The rendering of gray colors using only high saturation colors is avoided in the ULL palette by including a gray color from each luminance level in the palette. In the luminance level 46 of FIG. 2, for example, the gray color 48 is included in the ULL palette of the present invention. A gray color on or near the diagonal 49 (FIG. 1) on other luminance levels are also included. Pixels having gray or very low saturation true colors can then be rendered by mapping to a gray color on an adjacent luminance level without producing Saruman effect artifacts.

Figure 4:
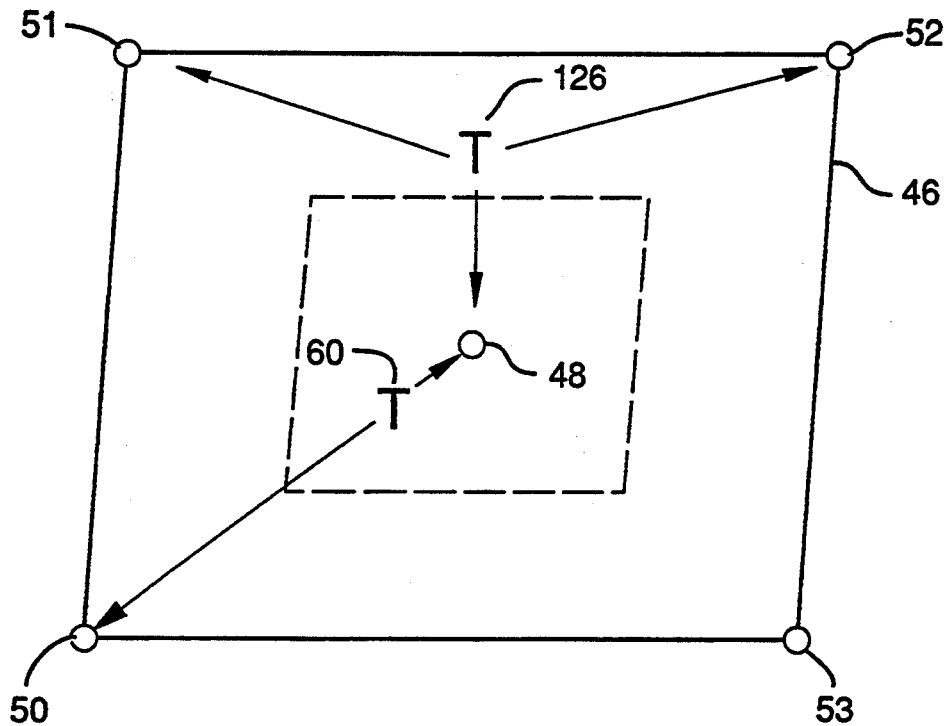
FIG. 4 is a top view of the luminance level of FIG. 2 including an arrangement of colors for a palette demonstrating the Saruman and anti-Saruman effects.

Referring to FIG. 4, Saruman effect artifacts also result when the palette includes only a gray color and highly saturated colors on a particular luminance level. If the palette includes, for example, only a gray color 48 and the highly saturated colors 50-53 at the vertices of the luminance level 46, an ordered dithering or error diffusion rendering of an area of pixels having a low saturation true color 60 produces discernible Saruman effect artifacts. The gray color 48 is the nearest palette color to the true color 60. The highly saturated color 50 at a vertex of the level is the next nearest palette color. When the area of pixels having the true color 60 is rendered, the true color 60 will be mapped to a pattern of the gray color 48 and the nearest highly saturated color 50. The difference in color between the gray color 48 and the highly saturated color 50 is readily apparent to the eye. Therefore, the pattern of the gray color 48 and the highly saturated color 50 is perceptible to a viewer of the reproduced image as an artifact.

Referring again to FIG. 2, the rendering of true colors using a pattern of gray and highly saturated colors is avoided in the present invention by including in the ULL palette a selection of low saturation colors surrounding the gray color of each luminance level. On the luminance level 46, for example, the ULL palette includes a selection of low saturation colors 70-74 in approximately the shape of a first circle 76 around the gray color 48. The number of low saturation colors selected from each level is related to the area of the luminance level. More specifically, the number of low saturation colors increases as the area of the luminance level increases. The luminance level 46 is among the largest in area of the luminance levels 34 (FIG. 1) and therefore has a greater number of low saturation colors than luminance levels with smaller areas, such as the luminance levels 40 (FIG. 1) near black. On luminance levels having large areas, such as luminance level 46, the low saturation colors are preferably arranged in more than one circle. The ULL palette, therefore, includes a second circle 78 of less saturated colors 80–86 on luminance level 46.

Figure 5:
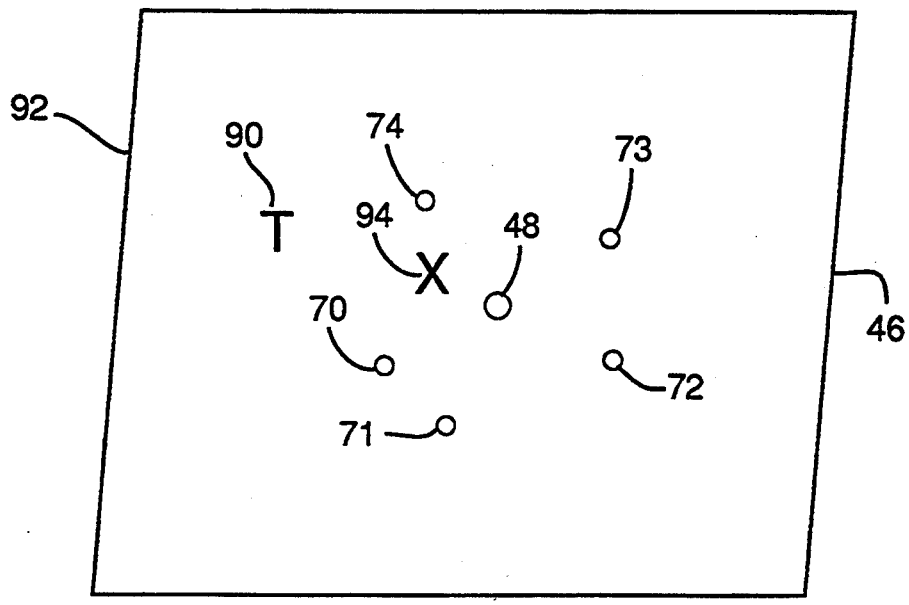
FIG. 5 is a top view of the luminance level of FIG. 2 including an arrangement of colors for a palette lacking the colors at the vertices of the level.

Referring to FIG. 5, a further problem occurs when attempting to render a highly saturated true color by blending two or more colors that are less saturated. For example, if the palette includes only low saturation colors on the luminance level 46 such as the gray color 48 and the low saturation colors 70–74, a highly saturated true color 90 near an edge 92 of the luminance level 46 will be rendered by a dithering process using a pattern of the nearest palette colors (the low saturation colors 70, 74 and possibly the gray color 48), all of which are less saturated. As a result of such rendering, the eye perceives the average of the colors 48, 70, 74, e.g. a low saturation (pastel) color 94. In fact, it is impossible to render the highly saturated true color 90 using only the less saturated palette colors 48, 70–74 so that the highly saturated true color is perceived by the viewer.

Figure 2:
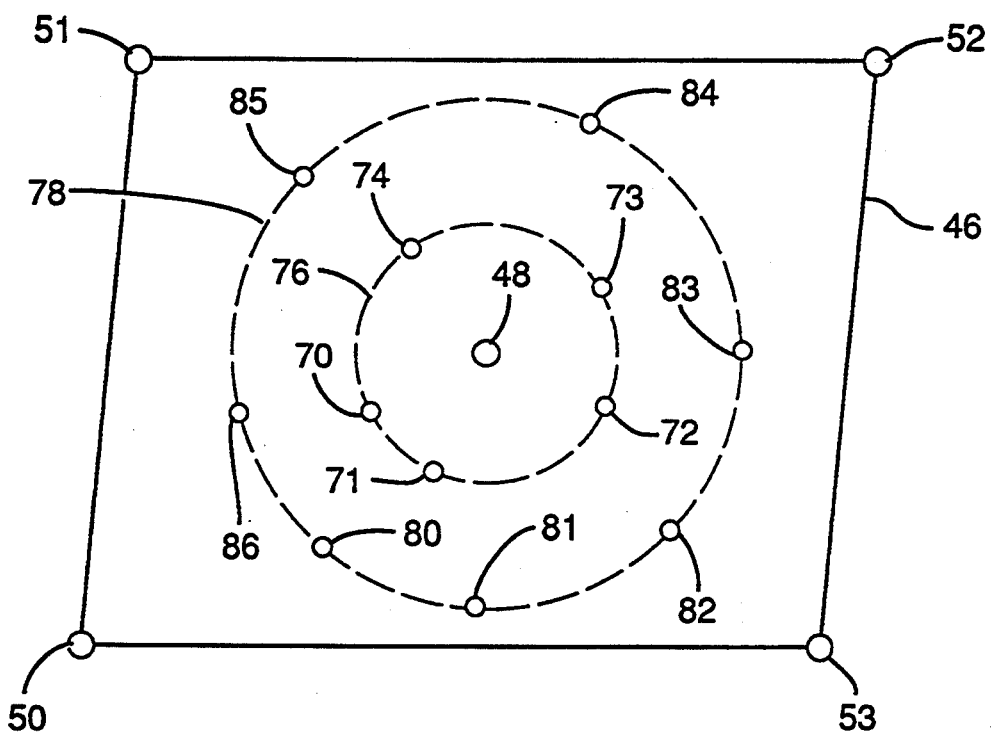
FIG. 2 is a top view of one of the luminance levels in FIG. 1 including an arrangement of palette colors chosen according to the present invention.

To reproduce the true color 90, the palette must include at least one palette color on the luminance level 46 that is near to and more saturated than the true color 90. With reference to FIG. 2, since the colors 50–53 at the vertices of the luminance level 46 are the most saturated colors on the level, including the colors 50–53 in the ULL palette guarantees that there is at least one more highly saturated color available in the palette for rendering each true color on the luminance level. Including the colors at the vertices of each luminance level in the ULL palette guarantees that all true colors can be rendered.

When a pixel color is rendered using the luminance emphasized mapping method described below, however, it is not necessary to include the colors at the vertices of all 26 luminance levels to guarantee that all 35 colors can be rendered. This is because a pixel color is always rendered by the luminance emphasized mapping method using only the palette colors from the two luminance levels nearest to the pixel color. As long as a more saturated color is available in the palette on one of the adjacent luminance levels, the anti-Saruman effect is prevented.

Figure 6:
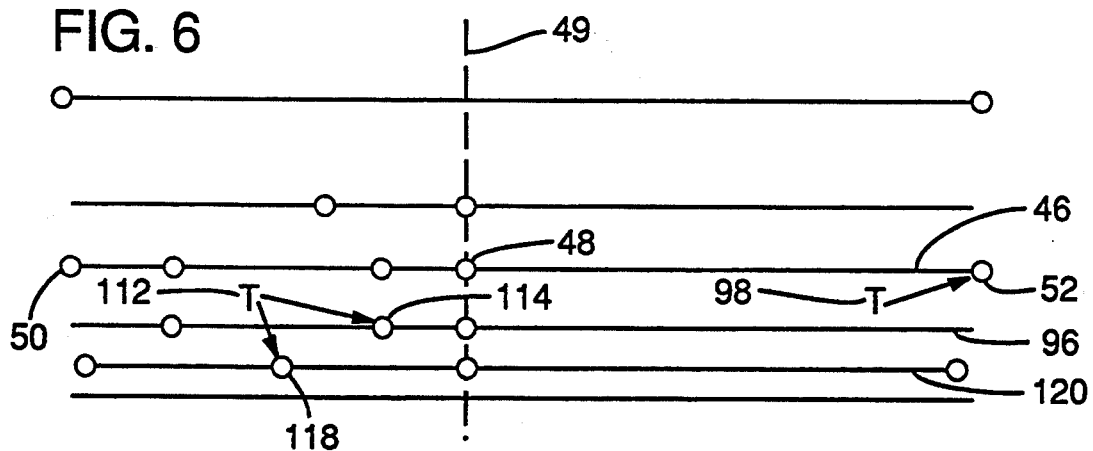
FIG. 6 is a sectional side view of a plurality of the luminance levels of FIG. 1.

Referring to FIG. 6, for example, the luminance levels 46, 96 are adjacent to a true color 98 located between the levels in the RGB color model 20 (FIG. 1). When luminance emphasized mapping is used, the true color 98 is rendered by dithering processes using the nearest palette colors on the two adjacent luminance levels 46, 96. If the palette includes the colors 50–53 (FIG. 2) at the vertices of the level 46 but does not include any of the colors at the vertices of the level 96, a more saturated color (the color 52) is still available for rendering the true color 98. In fact, there is still at least one color in the palette that has equal or more saturation available for rendering all true colors on or between the adjacent luminance levels 46, 96 when the vertices of only one of the adjacent luminance levels is included in the palette. At a minimum, the ULL palette need include only the colors at the vertices of every alternate luminance level of the 26 luminance levels (and the colors 36, 38, 40–45 at the vertices of the cube 30 of FIG. 1) to guarantee that there is at least one more saturated palette color available for rendering, with luminance emphasized mapping, all true colors in the RGB color model 20. In the preferred embodiment, therefore, the ULL palette includes the colors at the vertices of only every alternate luminance level rather than those at the vertices of every luminance level to minimize the number of colors in the palette while providing sufficient highly saturated colors to ensure that all true colors can be rendered.

The number of palette colors can also be minimized for a given number of luminance levels and still avoid the Saruman effect by including only the gray color of every alternate luminance level rather than that of every level. However, due to the eye's greater sensitivity to colors with low saturations, better quality image reproduction can be obtained by minimizing the number of colors at the vertices of the luminance levels included in the palette rather than minimizing the number of gray colors.

Further sensitivities of the human eye can be exploited to minimize the number of palette colors while maintaining a high image quality. For example, the eye more easily discerns artifacts on images of the human face and in large areas of constant color or smooth gradations of color. Therefore, image quality can be increased with the same number of palette colors by concentrating the palette colors in the ranges of flesh colors and sky colors. In the preferred embodiment, the low saturation colors surrounding the gray color of each luminance level are more highly concentrated in the flesh and sky colors to further increase image quality with a limited color resolution.

Figure 7:
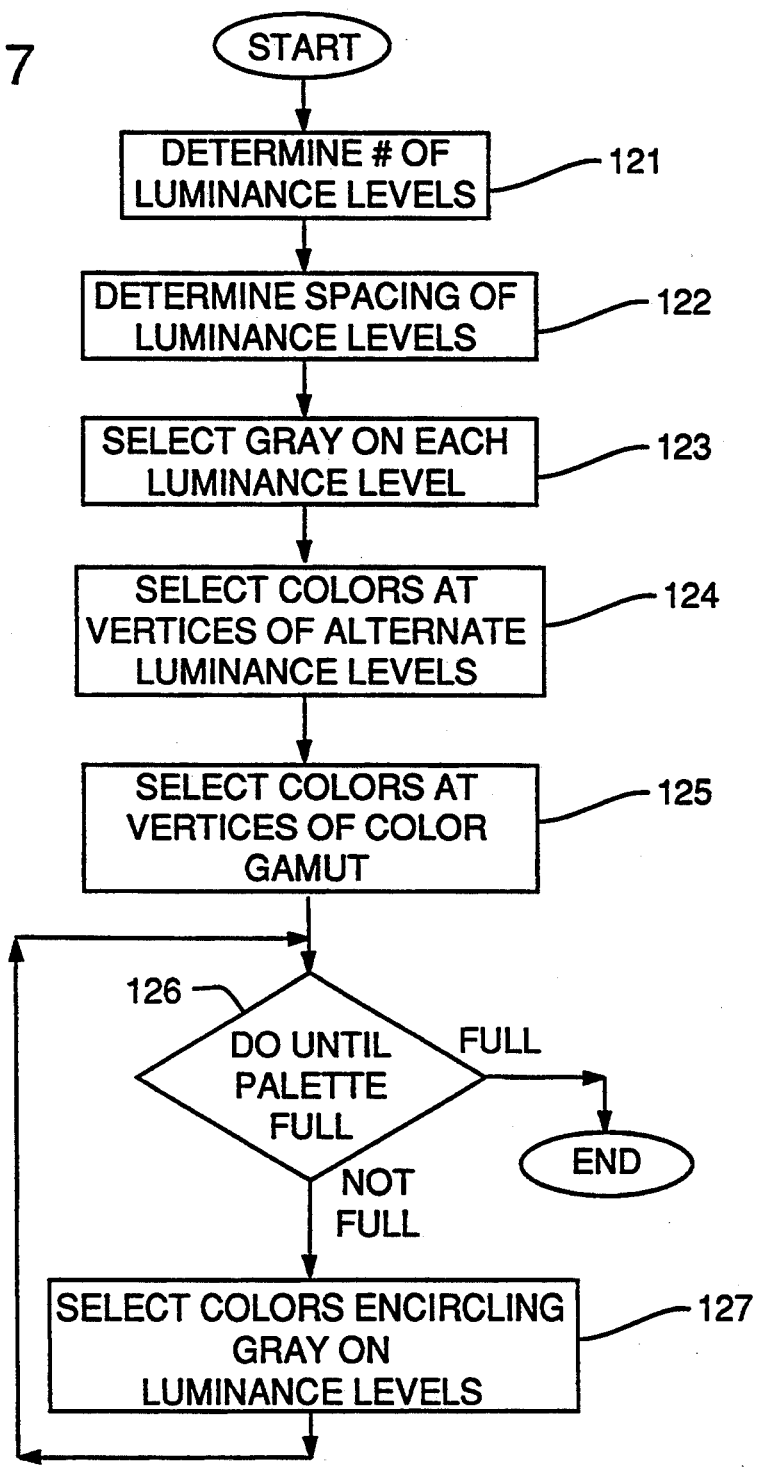
FIG. 7 is a flow chart diagram of a method for selecting a uniform luminance level palette according to a preferred embodiment of the invention.

The colors of the ULL palette are preferably selected according to the method illustrated in FIG. 7. First, in step 121, the number of luminance levels used in selecting colors for the ULL palette is determined. In the preferred embodiment of the invention, twenty six luminance levels 34 (FIG. 1) are used to select colors of a ULL palette having an 8-bit color resolution. In step 122, the distribution or spacing of the luminance levels in the RGB color model 20 is determined. As described above, the luminance of the levels is determined generally from the cube of an arithmetic progression from zero to one. For the twenty six luminance levels of the preferred embodiment, the luminances are given generally from the progression in equation (1). This spacing is further altered by increasing the spacing of the closely spaced luminance levels 39 near black 36 to a minimum spacing. Also, the spacing of some levels is preferably biased so that the colors 40–45 at the vertices of the color model 20 are included on the luminance levels.

Selection of colors from the luminance levels to fill the ULL palette begins in step 123 by selecting a gray from each of the luminance levels. (The gray on each of the luminance levels 34 is located at the intersection of the diagonal line 49 from black 36 to white 38 with the respective luminance level.) Selecting the gray from each luminance level helps prevent Saruman effect artifacts in images rendered with the ULL palette.

In steps 124 and 125, the colors at the vertices of alternate luminance levels (e.g. 50–53 on luminance level 46 in FIG. 2) and at the vertices of the color model 20 (e.g. colors 40–45 in FIG. 1) are selected. As described above, selecting these colors guarantees that all colors in the RGB color model 20 (FIG. 1) can be rendered using luminance emphasized mapping and error diffusion.

Finally, in steps 126 and 127, a number of additional colors from each luminance level in relation to the area of the luminance level are selected until all colors of the ULL palette have been selected. Preferably, the colors are chosen to encircle the gray on each luminance level to prevent the Saruman effect. (See FIG. 2.) The colors should also be chosen to be more concentrated in the flesh and sky colors to help prevent the more easily discernable artifacts in areas of images having these colors.

In the preferred embodiment of the present invention, true color images are rendered with the ULL palette using a luminance emphasized mapping method. The luminance emphasized mapping method operates to map a pixel color to a palette color that is nearly the same in luminance even if another palette color differing more in luminance is actually closer in color. When a true color image is rendered using the luminance emphasized mapping method, it appears to have a higher quality because the eye is more sensitive to differences in luminance than to differences in color.

With reference to FIG. 6, a pixel's true color is mapped according to the luminance emphasized mapping method to the nearest of the colors in the ULL palette on a luminance level adjacent to the true color. For example, the luminance levels 46, 96 are adjacent to a true color 112. Of the palette colors on the luminance levels 46, 96, a palette color 114 on the luminance level 96 is nearest to the true color 112. However, a palette color 118 on a luminance level 120 not adjacent to the true color 112 is actually closer to the true color. In a straight-forward mapping of pixel colors to their nearest palette colors, the true color 112 would be mapped to the palette color 118. When mapped according to the luminance emphasized mapping method, however, a pixel having the true color 112 maps to the nearest palette color 114 on the adjacent luminance level 96. The palette color 114 mapped with the luminance emphasized method will actually appear to the eye to be closer to the true color 112 than the palette color 118 because of the eye's greater sensitivity to the difference in luminance between the true color 112 and the palette color 118 than to the difference in color between the true color 112 and the palette color 114.

The luminance emphasized mapping method is preferably used with a palette consisting of colors on discrete luminance levels, such as the ULL palette described above. The method can also be used with other palettes, however. When used with a palette that does not consist entirely of colors on discrete luminance levels, the method maps a true color to the nearest of the palette colors that are on or between the luminance levels adjacent to the true color. For example, in FIG. 6, for a palette that includes colors not on the luminance levels, the true color 112 would be mapped to the nearest of the palette colors that are on or between the luminance levels 46, 96 adjacent to the true color 112.

Referring again to FIG. 4, the mapping of a true color to a palette color in the preferred embodiment is subject to an additional constraint intended to prevent the anti-Saruman effect. The anti-Saruman effect occurs when the nearest palette color to a highly saturated true color is a gray or very low saturation color. Consider for example, a palette which includes only the gray 48 and the highly saturate corner colors 50-53 from the luminance level 46. The nearest palette color to a highly saturated true color 126 near the border of the luminance level 46 is the gray 48. A mapping of the true color 126 to the gray color 48 results in a loss of saturation in the reproduced image that cannot be recovered even if neighboring pixels are mapped to higher saturation colors through error diffusion such as to the colors 51-52 at the vertices of the luminance level 46.

In the preferred embodiment of the invention, this loss of saturation in the reproduced image or anti-Saruman effect is prevented by prohibiting mappings which result in the anti-Saruman effect. (This process is hereinafter referred to as the anti-Saruman constraint mapping method). More specifically, a highly saturated true color is prohibited from being mapped to a low saturation palette color if a color at twice the error or directed distance from the low saturation palette color to the highly saturated true color would be located outside the color gamut. The highly saturated true color is instead mapped to the next nearest allowable palette color. For example, those true colors on the luminance level 46 within a rectangle 130 halfway between the gray 48 and the borders of the luminance level have an error from the gray 48 which is less than half the distance to a border of the luminance level 46. Therefore, doubling the error of colors within the rectangle would not place them outside the luminance level. Thus, the colors can be mapped to the gray 48 in accordance with the anti-Saruman constraint mapping method. However, those true colors on the luminance level 46 outside the rectangle 130 have an error from the gray 48 which is more than half the distance to a border of the luminance level. Doubling the error of the colors outside the rectangle 130 would place them outside the luminance level 46. Therefore, the colors outside the rectangle 130 according to the anti-Saruman constraint mapping method are not mapped to the gray 48 even if it is the nearest palette color. They are instead mapped to the next nearest allowable palette color. The same anti-Saruman constraint applies to mapping a highly saturated true color to other low saturation colors other than gray.

The determination of which palette color is nearest to a true color can be done by truncation or bit-shifting operations when a palette consists of colors that form a uniform grid in the RGB color model 20 (FIG. 1). Digital computers perform such operations quickly. However, with palettes that do not consist of a uniform grid of colors, such as the ULL palette of the present invention, the determination of which palette color is nearest to a true color usually cannot be done with simple truncation or bit-shifting operations. With such palettes, the determination of the nearest palette color usually involves a lengthy computation. The additional mapping constraints of the luminance emphasized mapping and anti-Saruman constraint mapping methods described above impose an added computational load. Accordingly, the mapping of true colors to palette colors in the present invention is preferably pre-determined and stored in a look-up table.

A look-up table which stores a palette color mapping for all 24-bit true colors would require 16.8 million entries. Although each entry of the table need only be an 8-bit palette color that is addressable by a 24-bit true color, the table still requires nearly 16.8 million bytes of storage. For most applications, a look-up table of this size is prohibitively large.

The size of the look-up table is preferably reduced by employing an ordered dithering process. First, a pixel's true color is converted by ordered dithering to a color in a intermediate palette consisting of colors in a uniform grid and having a color resolution less than true color but greater than the ULL palette. The intermediate palette color is then mapped according to the methods of the present invention to a ULL palette color using a look-up table. By first ordered dithering the true color to an intermediate palette color, the size of the look-up table is reduced. The look-up table need have only as many entries as there are colors in the intermediate palette. However, the ordered dithering process does require some additional computation for each pixel being mapped. The size reduction of the look-up table, therefore, is obtained at the price of some additional computational overhead.

In the preferred embodiment of the invention, the intermediate palette has a color resolution of 15 bits. Five of the 15 bits are a red intensity value, 6 bits are a green intensity value, and 4 bits are a blue intensity value. To permit ordered dithering, the intermediate palette is structured as a uniform grid of colors in the RGB color model. With 5 bits of red intensity value, there are $2^5$ or 32 levels of red intensity in the grid. Likewise there are 64 green intensity levels and only 16 blue intensity levels. By providing more green intensity levels and fewer blue intensity levels, the eye's greater sensitivity to changes in the intensity of the green component of colors and lesser sensitivity to intensity changes of the blue component is exploited to maximize the color quality provided by a given color resolution of the intermediate palette. With the preferred color resolution of 15 bits, only 32,768 entries are required in the look-up table to associate each intermediate palette color with a ULL palette color. The 15-bit color resolution is preferred for the intermediate palette because ordered dithering to an intermediate palette with such a resolution prior to table look-up does not significantly affect the luminance emphasized and anti-Saruman constraint mapping of a true color to a ULL palette color.

Figure 8:
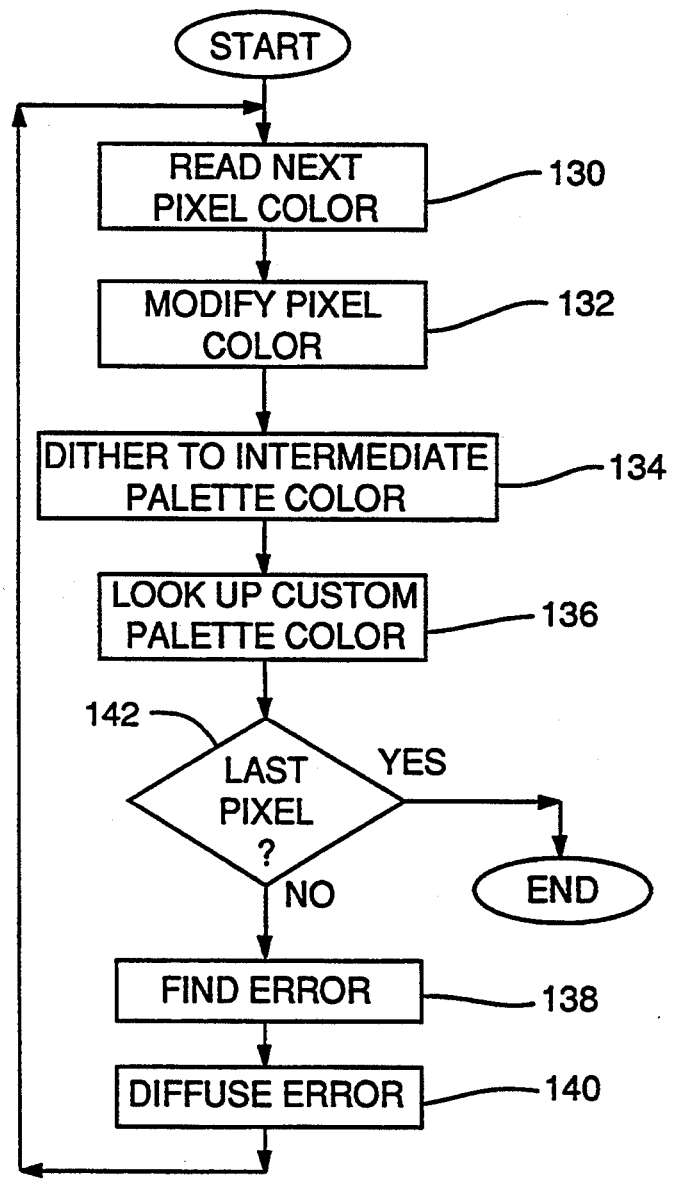
FIG. 8 is a flow chart diagram of a method for rendering an image with the colors of the custom palette according to a preferred embodiment of the invention.

With reference to a flow chart shown in FIG. 8, in the preferred embodiment of the invention, the luminance emphasized and anti-Saruman constraint mapping of true colors to the ULL palette forms a part of a rendering method employing error diffusion. The rendering method comprising steps 130-140 is performed once for each pixel in a 24-bit true color image. Preferably, the method is performed on each pixel in the image starting at the top left and proceeding left to right across each line of pixels in the image from the top line to the bottom line. However, the invention can be modified to process the pixels in a different order.

In the first step 130 of the rendering method, the true color of a pixel is read from a computer memory where the color image is stored. In the second step 132, the true color is modified by first adding the accumulated error diffused from any previously rendered neighboring pixels to the true color. The error diffused from previously rendered pixels is typically stored in temporary computer memory of sufficient size to store accumulated error values for up to two lines of pixels. The sum of the true color and the accumulated diffused error is then clipped to the bounds of the RGB color model. In other words, if the sum of the true color and the accumulated diffused error exceeds one in any of the red, green or blue dimensions, the sum is reduced to one in that dimension. Likewise, if the sum is less than zero in any of the dimensions, it is set equal to zero in that dimension. The clipped sum of the true color and the diffused error forms a modified true color for the pixel.

In the third step 134, the modified true color is mapped to a color in the intermediate palette using ordered dithering as described above. Using the cartesian coordinate (x,y) of the pixel in the color image, a scaling factor is located at the position (x mod 4, y mod 4) in the following preferred threshold matrix:

| 0 | $\frac{6}{16}$ | $\frac{9}{16}$ | $\frac{15}{16}$ |
|---|---|---|---|
| $\frac{11}{16}$ | $\frac{13}{16}$ | $\frac{2}{16}$ | $\frac{4}{16}$ |
| $\frac{7}{16}$ | $\frac{1}{16}$ | $\frac{14}{16}$ | $\frac{8}{16}$ |
| $\frac{12}{16}$ | $\frac{10}{16}$ | $\frac{5}{16}$ | $\frac{3}{16}$ |

For each of the red, green, and blue dimensions of the modified true color, an amount of dither equal to the scaling factor multiplied by the spacing between colors in that dimension of the intermediate palette is added to that dimension of the modified true color. The sum of the dither and the modified true color is then truncated in each dimension to the nearest intermediate palette color. For example, for a pixel at (10, 13) in the color image, the scaling factor 1/16 located at (2, 1) in the threshold matrix is used. In the intermediate palette, 5 bits are used to represent intensities of red light, yielding 32 discrete red intensity levels. Since the intermediate palette consists of colors in a uniform grid, the spacing between colors in the red dimension of the grid is 1/31. Therefore, the amount of dither added to the red dimension of the pixel's modified true color is 1/16 times 1/31 or 1/496. Similarly, the amount of dither added to the green and blue dimensions is 1/1008 (1/16×1/63) and 1/240 (1/16×1/15), respectively. The sum of the pixel's modified true color and the dither is then truncated to the nearest intermediate palette color. More specifically, the sum is truncated to the nearest 1/31 in the red dimension, the nearest 1/63 in the green dimension, and the nearest 1/15 in the blue dimension to yield the nearest intermediate palette color.

In the next step 136, the luminance emphasized and anti-Saruman constraint mapping of the pixel's intermediate palette color to a ULL palette color is determined using a look-up table as described above. The 8-bit ULL palette color is located in the table using the intermediate palette color as an index. The pixel is rendered in the reproduced image with this 8-bit ULL palette color.

In the step 138, the error between the pixel's rendered or ULL palette color and the pixel's true color is calculated. The error is simply the directed distance in the RGB color model 20 (FIG. 1) between the colors. The error can be found most efficiently by determining a 24-bit true color representation of the ULL palette color. The 24-bit representations of the pixel's true color and ULL palette color are each comprised of 8-bit red, green and blue intensity values. The error in each dimension is the difference between the colors' 8-bit intensity values for that dimension.

In the step 140, the error is diffused to neighboring pixels that have not yet been rendered. In the preferred embodiment of the invention, the error is diffused according to the Floyd-Steinberg filter described above. Other error diffusion filters can, however, be used.

The process is repeated for each pixel of an image. However, the steps 138-140 need not be performed for the last pixel in an image since all other pixels will already have been rendered. Therefore, at a comparison step 142 between the steps 136, 138, the process will end before the steps 138-140 if the last pixel is being processed.

The present invention including the ULL palette, mapping and rendering methods can be implemented in an electronic circuit such as on an integrated chip on a display adapter card used in computer systems. The present invention can also be implemented in software form in an operating system or display driver used in computer systems. When implemented in software form, the methods of the invention are performed by a processor circuit in the computer system.

Having described and illustrated the principles of my invention with reference to a preferred embodiment, it will be recognized that the invention can be modified in arrangement and detail without departing from such principles. In view of the many possible embodiments to which the principles of my invention may be put, it should be recognized that the detailed embodiments are illustrative only and should not be taken as limiting the scope of my invention. Rather, I claim as my invention all such embodiments as may come within the scope and spirit of the following claims and equivalents thereto.

We claim:

1. A method for reproducing a color image at a lower color resolution, the color image comprising a plurality of pixels each having one of a plurality of colors in an original palette, the method comprising the steps of:
   defining at least three discrete luminance levels;
   defining a reduced resolution palette comprising a plurality of colors, at least one of the reduced resolution palette colors being nearer to a first original palette color than any of the reduced resolution palette colors on or between two of the at least three luminance levels that are adjacent the first original palette color;
   for each pixel color in the color image, mapping the pixel color to a selected color in the reduced resolution palette that, out of a plurality of colors in the reduced resolution palette on or between two of the at least three luminance levels that are adjacent to the pixel color, is nearest to the pixel color; and
   reproducing the color image using the selected colors in the reduced resolution palette.

2. The method of claim 1 further comprising the step of error diffusing the color image.

3. The method of claim 2 further comprising for each of a plurality of pixels of the color image the steps of:
   reading a true pixel color from a memory where the image is stored;
   modifying the true pixel color with error diffused from any previously rendered, neighboring pixels;
   determining which one of the colors of the reduced resolution palette on or between two of the at least three luminance levels that are adjacent to the modified pixel color is nearest in an RGB color gamut to the modified pixel color, said one of the colors being an approximate palette color for the pixel;
   rendering the pixel using the determined approximate palette color;
   calculating an error between the determined approximate palette color and the true pixel color; and
   diffusing the error to any not yet rendered neighboring pixels.

4. The method of claim 3 wherein the step of modifying further comprises the steps of:
   scaling errors diffused from any previously rendered neighboring pixels;
   accumulating the scaled errors; and
   adding to the pixel color the accumulated, scaled errors to form the modified pixel color.

5. The method of claim 3 further comprising, after the step of modifying, clamping the modified pixel color to the boundaries of the RGB color gamut.

6. The method of claim 2 further comprising for each of a plurality of pixels of the color image the steps of:
   reading a true pixel color from a memory where the image is stored;
   modifying the true pixel color with error diffused from previously rendered, neighboring pixels;
   clamping the modified pixel color to the boundaries of an RGB color gamut;
   ordered dithering the modified pixel color to an intermediate palette color;
   determining which one of the colors of the reduced resolution palette on or between two of the at least three luminance levels that are adjacent to the color in the intermediate palette is nearest in the RGB color gamut to the color in the intermediate palette, said one of the colors being an approximate palette color for the pixel;
   rendering the pixel using the approximate palette color;
   calculating an error between the approximate palette color and the true pixel color; and
   diffusing the error to not yet rendered neighboring pixels.

7. The method of claim 1 wherein the step of reproducing comprising reproducing the color image in visually perceptible form.

8. The method of claim 1 further comprising for each pixel of the color image the steps of:
   reading the color of the pixel from a memory where the image is stored; and
   determining which one of the colors of the reduced resolution palette on or between two luminance levels adjacent to the pixel color is nearest to the pixel color.

9. The method of claim 1 wherein the step of mapping further comprises:
   when a highly saturated pixel color is mapped to a selected color having a low saturation, if a color at twice the error of the highly saturated pixel color from the selected color is outside an RGB color gamut containing each color in the reduced resolution palette, mapping the pixel color to a color which is the next nearest of the palette colors located on or between two of the at least three luminance levels that are adjacent the pixel color.

10. The method of claim 1 further comprising the steps of:
    selecting colors of the reduced resolution palette from colors located on the discrete luminance levels in an RGB color gamut, the spacing in the RGB color gamut between adjacent luminance levels increasing between a level of minimum luminance and a level of maximum luminance.

11. The method of claim 10 further comprising the step of error diffusing the resulting image.

12. A method for reproducing a color image using a uniform luminance levels palette, the color image comprising a plurality of pixels each having one of a plurality of true colors in an original palette, the method comprising:
    for each pixel in a color image, selecting a mapping color nearest in an RGB color gamut to the true color of the pixel from the colors in a uniform luminance levels palette on two out of more than two discrete luminance levels that are adjacent the true color, the uniform luminance levels palette consisting of a plurality of colors located on each of the discrete luminance levels intersecting the RGB color gamut, the spacing in the RGB color gamut between adjacent luminance levels increasing between a level of minimum luminance to a level of maximum luminance, at least one of the colors in the uniform luminance levels palette being nearer to a first original palette color than any of the colors in the uniform luminance levels palette on two out of the discrete luminance levels that are adjacent the first original palette color.

13. The method of claim 12 wherein the step of selecting further comprises:
when a color at twice the error of the pixel's true color from the selected mapping color is outside the RGB color gamut, selecting as the mapping color a color which is the next nearest of the palette colors located on the two luminance levels adjacent the pixel color.

14. The method of claim 12 further comprising error diffusing the image.

15. The method of claim 14 wherein the step of selecting comprises:
dithering the pixel's true color to a color in an intermediate palette comprised of a plurality of colors in the form of a grid having fewer blue intensity levels than green intensity levels;
looking up a color in the uniform luminance levels palette for the pixel according to the pixel's intermediate palette color in a table, the table associating each of the intermediate palette colors with a corresponding color in the uniform luminance levels palette that is nearest of the uniform luminance levels palette colors that are on the two luminance levels adjacent such intermediate palette color and for which double the error from such intermediate palette color is not outside the RGB color gamut; and
selecting the uniform luminance levels palette color looked up in the table as the mapping color.

16. The method of claim 14 comprising for each pixel in the image:
adding error diffused from any previously rendered neighboring pixels to the true pixel color to form a modified pixel color;
dithering the modified pixel color to a color in an intermediate palette comprised of a plurality of colors in the form of a grid having uniformly spaced green intensity levels, uniformly spaced red intensity levels, uniformly spaced blue intensity levels, and fewer blue intensity levels than green intensity levels;
looking up a color in the uniform luminance levels palette for the pixel according to the pixel's intermediate palette color in a table, the table associating each of the intermediate palette colors with a corresponding color in the uniform luminance levels palette that is nearest of the uniform luminance levels palette colors that are on the two luminance levels adjacent such intermediate palette color and for which double the error from such intermediate palette color is not outside the RGB color gamut;
selecting the uniform luminance levels palette color looked up in the table as the mapping color;
determining an error between the mapping color and the true pixel color; and
diffusing the error to any not yet rendered neighboring pixels.

17. An apparatus for reproducing a color image using a reduced resolution palette, the apparatus comprising:
image storage means for storing a color image as an array of pixels, the pixels associated with color values in a first palette;
a look-up table addressable by color values for returning, when addressed by a first color value corresponding to a first color, a second color value corresponding to a second color which is the nearest to the first color in an RGB color gamut of a plurality of colors in a reduced resolution palette on two luminance levels adjacent to the first color out of at least three discrete luminance levels, the reduced resolution palette comprised of a plurality of color values corresponding to colors on the discrete luminance levels inside the RGB color gamut, the spacing in the RGB color gamut between adjacent luminance levels increasing between a level of minimum luminance and a level of maximum luminance;
table addressing means for associating each pixel of the color image with a color value in the reduced resolution palette by associating the pixel with a color value of the reduced resolution palette returned by the look-up table when addressed by a color value associated with the pixel;
image rendering means for forming the color image with each pixel of the color image associated with a color value in the reduced resolution palette.

18. The apparatus of claim 17 wherein the look-up table returns, when addressed by the first color value, a second color value corresponding to a second color which is the nearest to the first color in the RGB color gamut of the colors in the reduced resolution palette on the two luminance levels adjacent to the first color and for which double the error to the first color is inside the RGB color gamut.

19. The apparatus of claim 17 wherein the reduced resolution palette comprises the colors at the vertices of cross-sections of the RGB color gamut at alternate luminance levels.

20. The apparatus of claim 17 further comprising:
ordered dithering means for performing ordered dithering of the first palette color associated with each pixel to quantize the color associated with each pixel to colors in an intermediate palette, the table addressing means addressing the look-up table with color values of the intermediate palette.

21. The apparatus of claim 17 further comprising:
error diffusion means for performing error diffusion of an error between the reduced resolution palette color value associated with a pixel and the first palette color associated with the pixel to not yet rendered neighboring pixels.

* * * * *

UNITED STATES PATENT AND TRADEMARK OFFICE
CERTIFICATE OF CORRECTION

PATENT NO. : 5,341,464
DATED : August 23, 1994
INVENTOR(S) : Friedman et al.

It is certified that error appears in the above-identified patent and that said Letters Patent is hereby corrected as shown below:

At Col. 18, line 28, change "comprising" to --comprises--

Signed and Sealed this

Twenty-fifth Day of July, 1995

Attest:

BRUCE LEHMAN

Attesting Officer

Commissioner of Patents and Trademarks